(12) United States Patent
Kawachi et al.

(10) Patent No.: US 11,349,408 B2
(45) Date of Patent: May 31, 2022

(54) POWER SUPPLY SYSTEM AND METHOD FOR CONTROLLING POWER SUPPLY SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shunsuke Kawachi, Tokyo (JP); Koji Toba, Tokyo (JP); Daigo Kittaka, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/383,147

(22) Filed: Jul. 22, 2021

(65) Prior Publication Data

US 2021/0384843 A1 Dec. 9, 2021

Related U.S. Application Data

(63) Continuation of application No. PCT/JP2019/002108, filed on Jan. 23, 2019.

(51) Int. Cl.
*H02M 7/48* (2007.01)
*H02J 3/38* (2006.01)

(52) U.S. Cl.
CPC ............ *H02M 7/48* (2013.01); *H02J 3/38* (2013.01); *H02J 2300/22* (2020.01); *H02J 2300/28* (2020.01)

(58) Field of Classification Search
CPC ...... H02J 3/38; H02J 2300/28; H02J 2300/22; H02M 7/48; H02M 1/0003; H02M 7/23
See application file for complete search history.

(56) References Cited

U.S. PATENT DOCUMENTS

| | | | |
|---|---|---|---|
| 6,738,269 B2 | 5/2004 | Nomiya et al. | |
| 2013/0021829 A1 | 1/2013 | Sao | |
| 2016/0028315 A1* | 1/2016 | Joo | ............... H02M 1/36 363/21.12 |
| 2018/0367051 A1* | 12/2018 | Agamy | ............... H02M 3/3376 |
| 2020/0083709 A1* | 3/2020 | Umezu | ............... H02P 9/04 |
| 2020/0395760 A1* | 12/2020 | Wei | ............... F03D 7/028 |

FOREIGN PATENT DOCUMENTS

| | | |
|---|---|---|
| JP | 2002-101563 A | 4/2002 |
| JP | 2003-111283 A | 4/2003 |
| JP | 3543068 B2 | 7/2004 |
| JP | 4713996 B2 | 6/2011 |
| JP | 2013-207970 A | 10/2013 |
| JP | 5596086 B2 | 9/2014 |

\* cited by examiner

*Primary Examiner* — Jared Fureman
*Assistant Examiner* — Esayas G Yeshaw
(74) *Attorney, Agent, or Firm* — Finnegan, Henderson, Farabow, Garrett & Dunner L.L.P.

(57) ABSTRACT

A power supply system according to the present embodiment includes a plurality of first power converters configured to supply power according to dispatching characteristics of power to be supplied to a load, and a plurality of control devices each configured to associate a change ratio of active power to an output frequency of each of the first power converters with the dispatching characteristics and control each of the first power converters based on the change ratio.

10 Claims, 10 Drawing Sheets

POWER SUPPLY SYSTEM AND METHOD FOR CONTROLLING POWER SUPPLY SYSTEM

CROSS-REFERENCE TO RELATED APPLICATIONS

This application is a continuation application of International Application No. PCT/JP2019/002108, filed Jan. 23, 2019. The contents of this application is incorporated herein by reference in their entirety.

FIELD

Embodiments of the present invention relate to a power supply system and a method for controlling a power supply system.

BACKGROUND

In recent years, introduction of a renewable energy power supply has been promoted in a small-scale power system (an off-grid system) such as those in isolated islands. The renewable energy power supply such as solar power generation and wind power generation is connected to an AC system by a power converter (an inverter) using a power electronics technology. Such a power supply is referred to as "inverter based power supply". Further, a system to be installed to reduce output variations in the renewable energy such as an accumulator is also included in the inverter based power supply.

In order to operate such a power system stably, control for establishing a voltage and a frequency of the power system is required while maintaining allocation of output of a plurality of inverter based power supplies. As such control, control for providing drooping characteristics between active power and a voltage frequency of each inverter based power supply operated in a voltage source mode has been known. Power dispatching control is executed based on the drooping characteristics between the active power and the voltage frequency by integrating the drooping characteristics of inverter based power supplies. However, if each inverter based power supply is connected between nodes having different impedance characteristics, a balance between electricity supply between nodes and the integrated drooping characteristics between the active power and the voltage frequency is disrupted.

DETAILED DESCRIPTION

Figure 1:
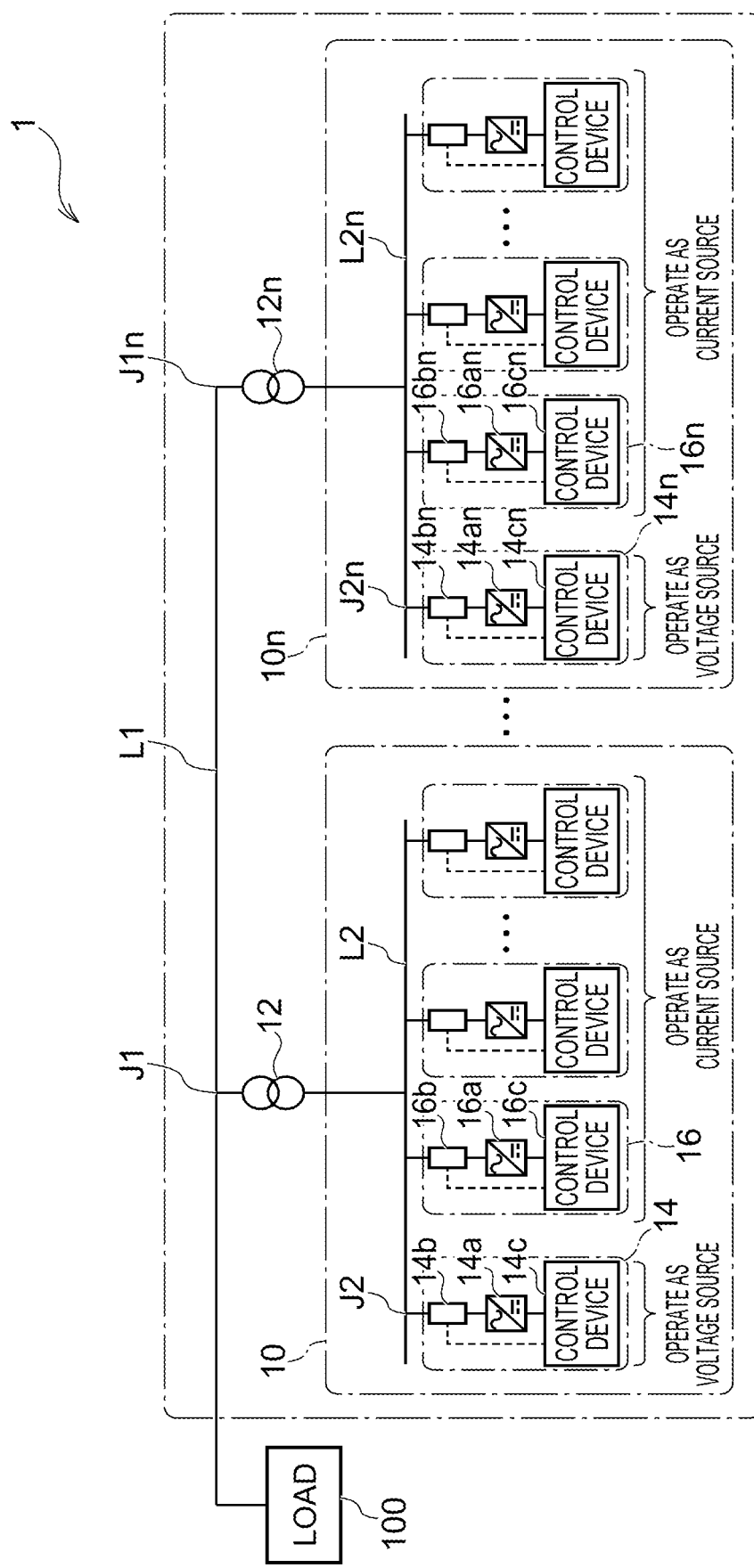
FIG. 1 is a diagram illustrating an overall configuration of a power supply system according to a first embodiment.

A power supply system according to the present embodiment comprises: a plurality of first power converters configured to supply power according to dispatching characteristics of power to be supplied to a load; and a plurality of control devices each configured to associate a change ratio of active power to an output frequency of each of the first power converters with the dispatching characteristics and control each of the first power converters based on the change ratio.

According to the present embodiment, it is possible to establish a voltage and a frequency of a system, while maintaining allocation of output of inverter based power supplies, when each inverter based power supply is connected between nodes having different impedance characteristics.

A power supply system and a method for controlling a power supply system according to embodiments of the present invention will be explained below in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

FIG. 1 illustrates an overall configuration of a power supply system 1 according to a first embodiment. As illustrated in FIG. 1, the power supply system 1 is an inverter system for supplying power to a load 100, and includes a plurality of distributed power supply groups 10 to 10n and a plurality of transformers 12 to 12n. FIG. 1 also illustrates the load 100, a first bus line L1, a plurality of second bus lines L2 to L2n, a plurality of nodes J1 to J1n, and a plurality of nodes J2 to J2n. The second bus lines L2 to L2n are connected in parallel to the first bus line L1 via the nodes J1 to J1n.

The distributed power supply group 10 is a power supply group capable of supplying power to the load 100 independently of other distributed power supply groups. The distributed power supply group 10 includes a first inverter based power supply 14 and a plurality of second inverter based power supplies 16.

The first inverter based power supply 14 is a power supply operating as a voltage source. The first inverter based power supply 14 includes a first power converter 14a, a voltage-current measurer 14b, and a control device 14c.

The first power converter 14a is, for example, an inverter, and converts power output from a power supply 110 (FIG.

2) to power that can be interconnected to a power system of the first bus line L1 via the second bus line L2. For example, the first power converter 14a converts DC power output from the power supply 110 (FIG. 2) to AC power. The first power converters 14a to 14an are connected to the second bus lines L2 to L2n via the nodes J2 to J2n.

The voltage-current measurer 14b measures a voltage and a current output from the first power converter 14a. The voltage-current measurer 14b is configured by, for example, an instrument current transformer and an instrument voltage transformer. Further, the voltage-current measurer 14b outputs a voltage measurement value and a current measurement value to the control device 14c.

The control device 14c controls the first power converter 14a based on the measurement value from the voltage-current measurer 14b. Details of the control device 14c are described later.

The second inverter based power supply 16 is a power supply operating as a current source. The second inverter based power supply 16 includes a second power converter 16a, a voltage-current measurer 16b, and a control device 16c.

The second power converter 16a is, for example, an inverter, and has the same configuration as that of the first power converter 14a. That is, the second power converter 16a converts power output from a power supply 120 (FIG. 5) to power that can be interconnected to the power system of the first bus line L1 via the second bus line L2.

The voltage-current measurer 16b has the same configuration as that of the voltage-current measurer 14b. That is, the voltage-current measurer 16b outputs a voltage measurement value and a current measurement value to the control device 16c.

The control device 16c controls the second power converter 16a based on the measurement value from the voltage-current measurer 16b. Details of the control device 16c are described later.

The distributed power supply groups 10 to 10n have the same configuration as that of the distributed power supply group 10. However, the dispatching characteristics of power to be supplied therefrom to the load 100 are different from each other. That is, the power to be supplied to the load 100 is distributed according to an impedance until each of the first power converters 14a to 14an is connected to the first bus line. That is, the dispatching characteristics of power to be supplied to the load 100 are defined by a power dispatch ratio according to the impedance until the first power converter is connected to the first bus line L1. Details of the dispatch ratio are described later.

The transformers 12 to 12n convert a voltage of power supplied from the second bus lines L2 to L2n to a reference voltage of the first bus line L1. The impedance until each of the first power converters 14a to 14an is connected to the first bus line also includes the impedance of the transformers 12 to 12n. A rotary distributed power supply may be connected to the first bus line L1.

Figure 2:
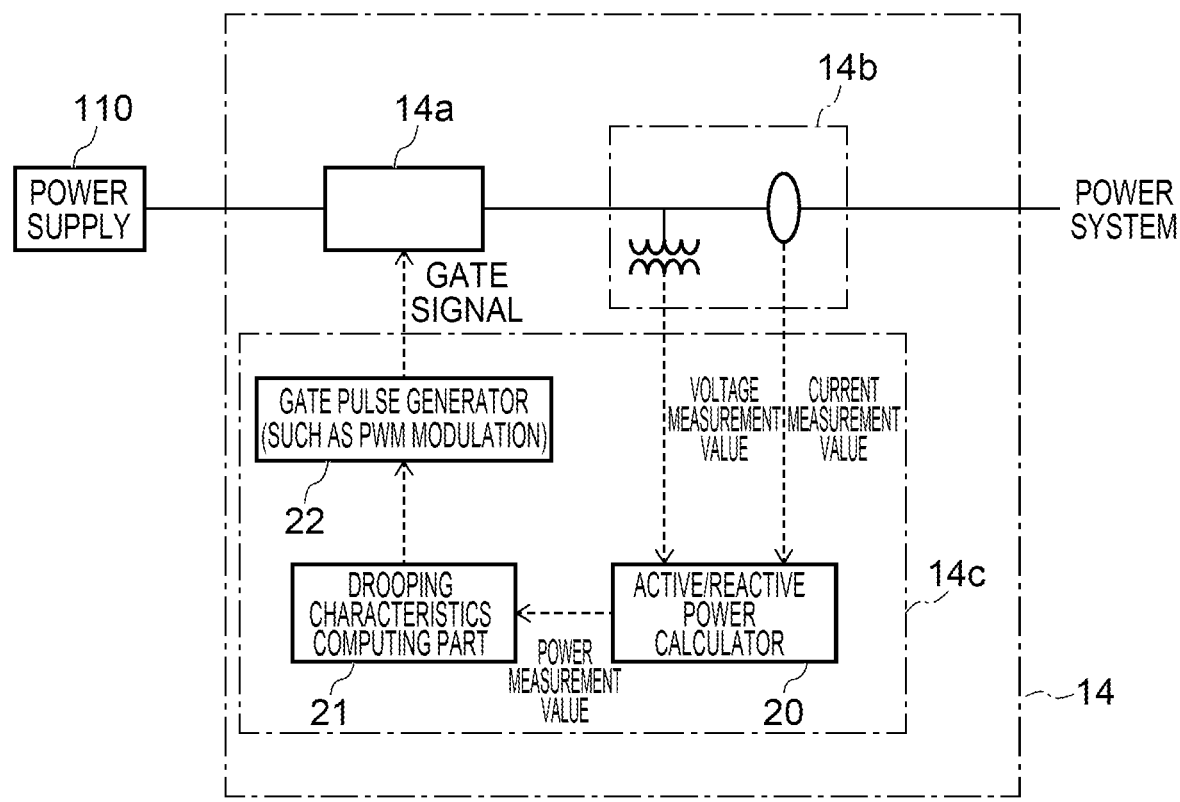
FIG. 2 is a diagram illustrating a configuration example of a control device when a first inverter based power supply operates as a voltage source.

FIG. 2 is a diagram illustrating a configuration example of the control device 14c when the first inverter based power supply 14 operates as a voltage source. As illustrated in FIG. 2, the control device 14c includes an active/reactive power calculator 20, a drooping characteristics computing part 21, and a gate pulse generator 22. FIG. 2 also illustrates the power supply 110. The power supply 110 is a renewable energy power supply, for example, solar power generation and wind power generation.

The active/reactive power calculator 20 calculates values of active power and reactive power output from the first power converter 14a based on a voltage measurement value and a current measurement value output from the voltage-current measurer 14b. The active/reactive power calculator 20 outputs the values of active power and reactive power to the drooping characteristics computing part 21.

The drooping characteristics computing part 21 outputs a command signal indicating an output voltage waveform of the first power converter 14a, based on active power-frequency drooping characteristics and reactive power-voltage drooping characteristics by using the values of active power and reactive power calculated by the active/reactive power calculator 20. That is, the drooping characteristics computing part 21 outputs a signal including information about a phase, a frequency, and an amplitude of the voltage waveform, as the command signal indicating the output voltage waveform.

Figure 3:
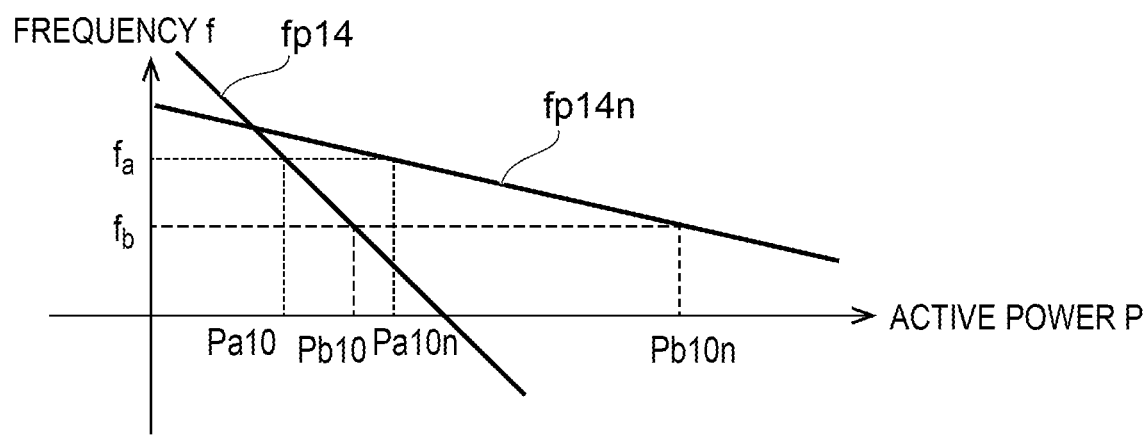
FIG. 3 is a diagram of active power-frequency drooping characteristics indicating a relation between active power and a frequency.

FIG. 3 is a diagram illustrating an example of the active power-frequency drooping characteristics indicating a relation between active power P and a frequency f. A horizontal axis indicates the active power P and a vertical axis indicates the frequency f. A characteristic line fp14 indicates the active power-frequency drooping characteristics of the first power converter 14a, and a characteristic line fp14n indicates the active power-frequency drooping characteristics of the first power converter 14an. The characteristic lines fp14 to fp14n of the plurality of first power converters 14a to 14an are defined according to dispatching characteristics of power supplied to the load 100.

As illustrated in FIG. 3, the drooping characteristics computing part 21 calculates a frequency of an output voltage by using the value of active power calculated by the active/reactive power calculator 20. That is, the drooping characteristics computing part 21 lowers the frequency at the time of increasing the active power of the first power converters 14a to 14an, and raises the frequency at the time of decreasing the active power thereof.

For example, the frequency fa is set to 60 Hz or 50 Hz being a reference frequency. The active power of the first power converter 14a in the case of the frequency fa is active power Pa10, and the active power of the first power converter 14an is active power Pa10n. Further, the active power of the first power converter 14a in the case of a frequency fb is active power Pb10, and the active power of the first power converter 14an is active power Pb10n.

In this case, a variation P1 in the active power in the first power converter 14a is expressed by an Expression (1). Further, a variation P1n in the active power in the first power converter 14an is expressed by an Expression (2).

$$P1 = Pb10 - Pa10 \tag{1}$$

$$P1n = Pb10n - Pa10n \tag{2}$$

In this case, a ratio of the variation P1 to the variation P1n in the active power at the reference frequency fa is, as expressed in an Expression (3), based on an inclination R1 of the characteristic line fp14 and an inclination R1n of the characteristic line fp14n.

$$P1:P1n = R1:R1n \tag{3}$$

where the inclination R1 and the inclination R1n are expressed by Expressions (4) and (5).

$$R1 = (Pb10 - Pa10)/(fb - fa) \tag{4}$$

$$R1n = (Pb10n - Pa10n)/(fb - fa) \tag{5}$$

As seen from these Expressions, if the ratio of the variation P1 to the variation P1n in the active power at the reference frequency fa is maintained at the ratio indicated by the Expression (3), each of the variations in the frequency becomes fb−fa, and becomes equal in the first power converters 14a and 14an. In other words, if the ratio of the variation P1 to the variation P1n is maintained at the ratio indicated by the Expression (3), instructed frequencies to the first power converters 14a to 14an become the same. That is, if the dispatching characteristics of the active power to be supplied to the load 100 is maintained at the ratio indicated by the Expression (3), even if the first power converters 14a to 14an are independently controlled, the frequency of the output voltage can be equalized.

The dispatching characteristics of the active power to be supplied to the load 100 can be set based on an impedance ratio between the nodes J2 to J2n and the corresponding nodes J1 to J1n. Accordingly, even if the distributed power supply groups 10 to 10n each execute independent control, the frequencies of the output voltages of the distributed power supply groups 10 to 10n match with each other.

Figure 4:
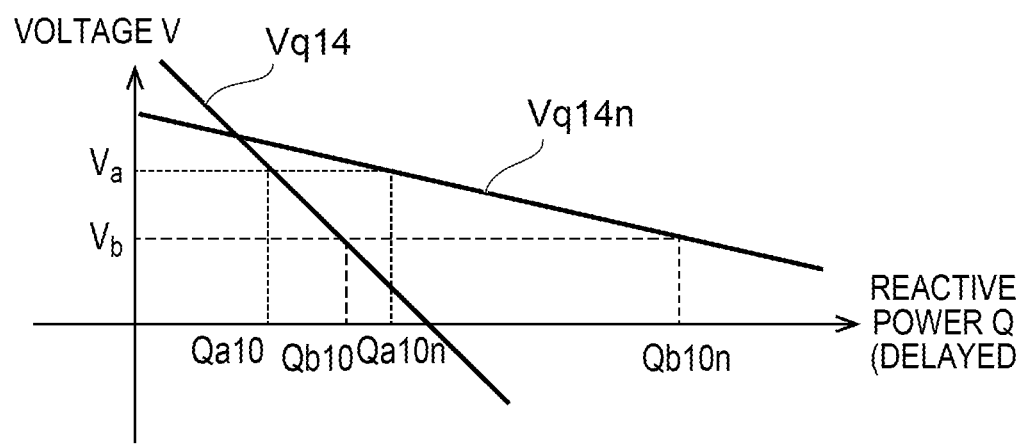
FIG. 4 is a diagram of reactive power-voltage drooping characteristics indicating a relation between a delayed reactive power and a voltage.

FIG. 4 is a diagram illustrating an example of reactive power-voltage drooping characteristics indicating a relation between delayed reactive power Q and a voltage V. A horizontal axis indicates the delayed reactive power Q and a vertical axis indicates the voltage V. A characteristic line Vq14 indicates the reactive power-voltage drooping characteristics of the first power converter 14a, and a characteristic line Vq14n indicates the reactive power-voltage drooping characteristics of the first power converter 14an. In the case of a voltage Va, the reactive power of the first power converter 14a is reactive power Qa10, and the reactive power of the first power converter 14an is reactive power Qa10n. Further, in the case of a voltage Vb, the reactive power of the first power converter 14a is reactive power Qb10, and the reactive power of the first power converter 14an is reactive power Qb10n.

As illustrated in FIG. 4, the drooping characteristics computing part 21 calculates the voltage V of the output voltage, that is, an amplitude by using the reactive power value calculated by the active/reactive power calculator 20. The drooping characteristics computing part 21 lowers the voltage V at the time of increasing the delayed reactive power Q of the first power converter 14a, and raises the voltage V at the time of decreasing the delayed reactive power Q. That is, when the delayed reactive power Q increases, the drooping characteristics computing part 21 outputs a signal to lower the amplitude, and when the delayed reactive power Q decreases, the drooping characteristics computing part 21 outputs a signal to raise the amplitude. A phase of the voltage waveform is calculated based on the values of the active power P and the reactive power Q.

As illustrated in FIG. 2, the gate pulse generator 22 generates a gate signal with respect to the first power converter 14a based on the command signal including information about a phase, a frequency, and an amplitude of the voltage waveform input from the drooping characteristics computing part 21. The gate signal is a signal for modulating the output voltage waveform of the first power converter 14a, and for example, is an On/Off signal of a semiconductor switch in the first power converter 14a. Further, as a modulation method at this time, for example, pulse width modulation (PWM modulation) is used.

Figure 5:
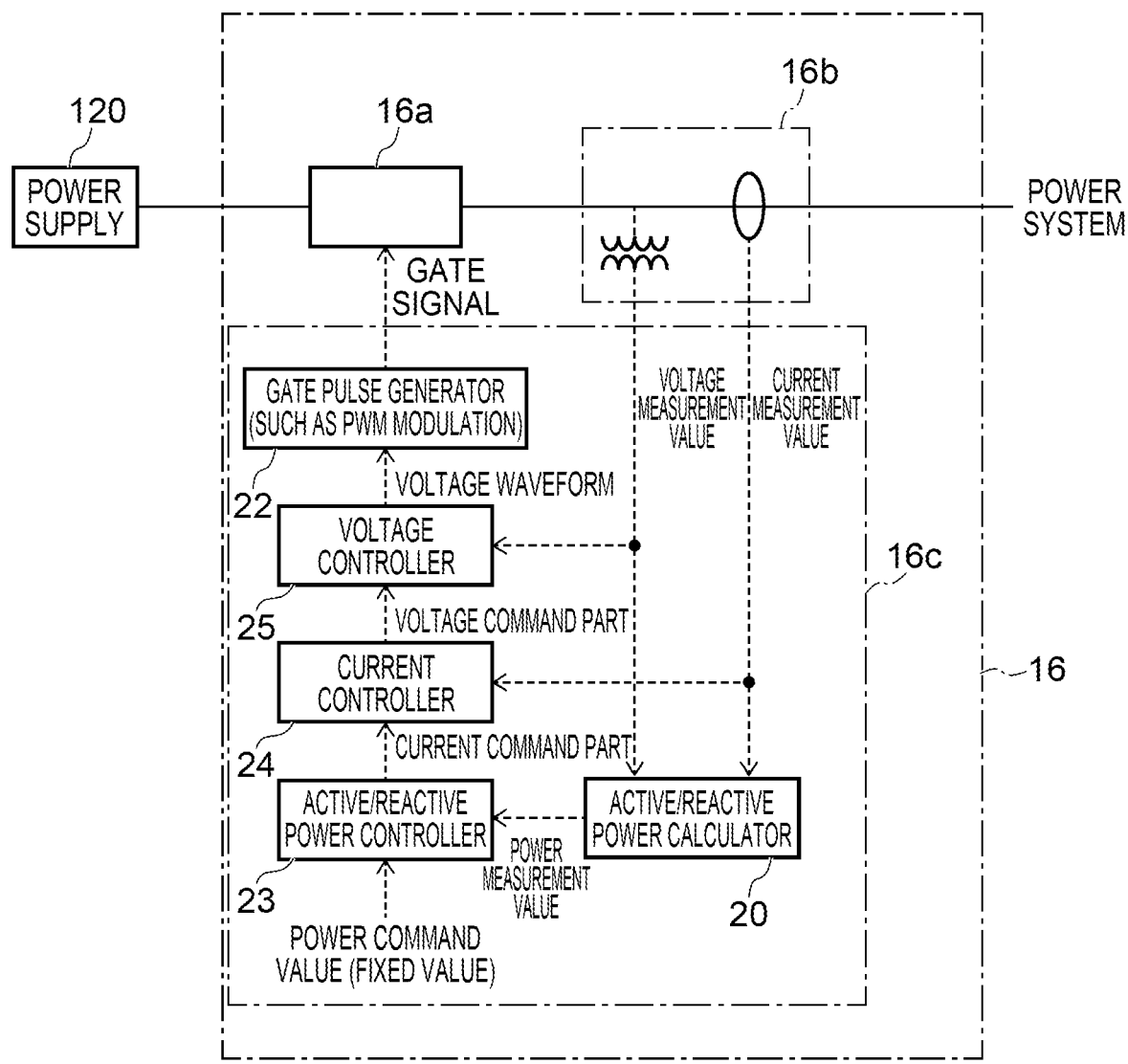
FIG. 5 is a diagram illustrating a configuration example of a control device when a second inverter based power supply operates as a current source.

FIG. 5 is a diagram illustrating a configuration example of the control device 16c when the second inverter based power supply 16 operates as a current source. As illustrated in FIG. 5, the control device 16c includes the active/reactive power calculator 20, the gate pulse generator 22, an active/reactive power controller 23, a current control device 24, and a voltage control device 25. Constituent elements identical to those in FIG. 2 are denoted by like reference characters and redundant explanations thereof are omitted.

The active/reactive power calculator 20 calculates values of active power and reactive power output by the second power converter 16a based on the output voltage measurement value and the output current measurement value of the second power converter 16a output from the voltage-current measurer 16b. The active/reactive power calculator 20 outputs the values of active power and reactive power to the active/reactive power control device 23.

The active/reactive power control device 23 receives as an input, an output power command value set in advance as a fixed value, and the values of active power and reactive power output from the second power converter 16a, and decides an output current command value of the second power converter 16a so that an output power value follows the output power command value. The output current command value to be used by the active/reactive power control device 23 may be variable according to a schedule. That is, the active/reactive power control device 23 sets the output power command value to a fixed value, or a variable value that changes with time. The active/reactive power control device 23 outputs the calculated output power command value to the current control device 24.

The current controller 24 decides a current command value so that an output current of the second power converter 16a follows the command value by using the output current measurement value of the second power converter 16a and the output current command value calculated by the active/reactive power control device 23.

The voltage controller 25 decides an output voltage waveform of the second power converter 16a by using the output voltage measurement value of the second power converter 16a and the voltage command value calculated by the active/reactive power control device 23. Information about the output voltage waveform of the second power converter 16a calculated by the voltage control device 25, that is, the command signal including the information about a phase, a frequency, and an amplitude is input to the gate pulse generator 22.

The gate pulse generator 22 generates a gate signal with respect to the second power converter 16a based on the command signal including the information about a phase, a frequency, and an amplitude of the voltage waveform input from the voltage control device 25. The gate signal is a signal for modulating the output voltage waveform of the second power converter 16a and, for example, is an On/Off signal of a semiconductor switch in the second power converter 16a. Further, as a modulation method at this time, for example, the pulse width modulation (PWM modulation) is used. Accordingly, the second power converter 16a outputs power corresponding to the fixed power command value.

Figure 6:
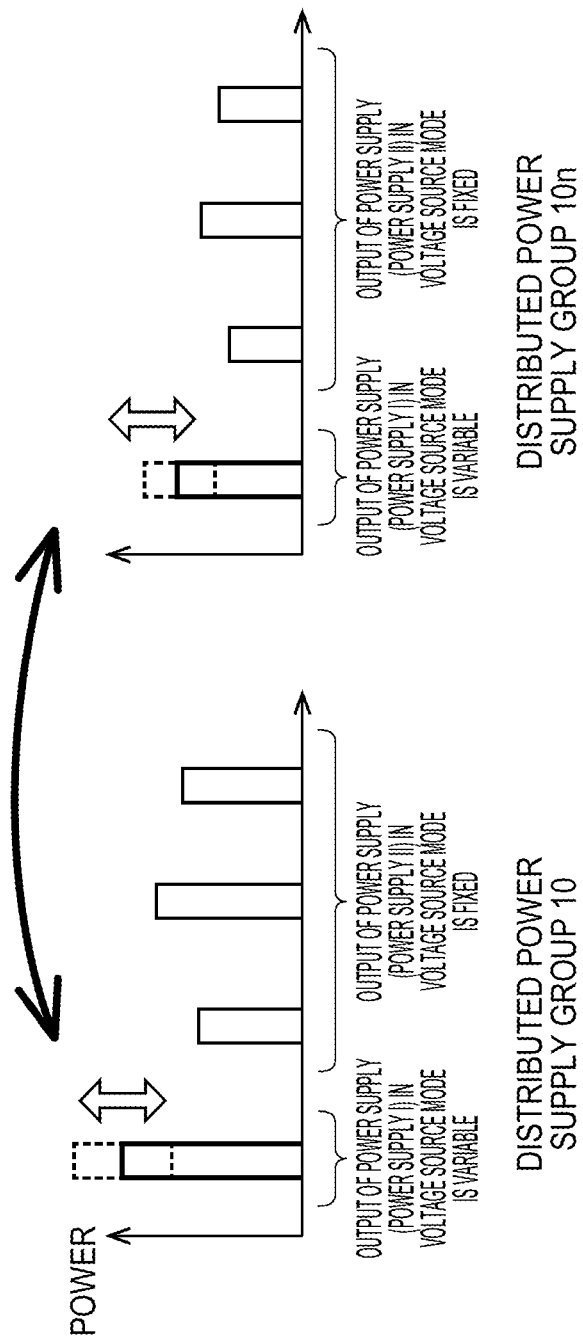
FIG. 6 is a diagram illustrating an operation example of the power supply system.

FIG. 6 is a diagram illustrating an operation example of the power supply system 1 according to the first embodiment. A left diagram illustrates an output example of the distributed power supply group 10, and a right diagram illustrates an output example of the distributed power supply group 10n. A vertical axis indicates power, and a horizontal axis each indicates the first inverter based power supply (power supply I) and a plurality of second inverter based power supplies (power supply II).

As described above, allocation of output of the inverter based power supplies 14 to 14n is allocated based on an impedance ratio between the nodes J2 to J2n and the corresponding nodes J1 to J1n. That is, the allocation of output between the first power converters 14*a* to 14*an* is automatically allocated according to the characteristics illustrated in FIG. 3 and FIG. 4 according to the magnitude of power required by the entire system. For example, in the distributed power supply group 10, the control device 14*c* controls the first power converter 14*a* so as to compensate for the variation P1 (Expression (1)) of the active power independently of the distributed power supply group 10*n*, thereby enabling to supply the active power according to the allocation of output. The frequency of the output power of the first power converters 14*a* at this time is fb. Similarly, in the distributed power supply group 10*n*, the control device 14*cn* controls the first power converter 14*an* so as to compensate for the variation P1*n* (Expression (2)) of the active power independently of the distributed power supply group 10, thereby enabling to supply the active power according to the allocation of output. The frequency of the output power of the first power converters 14*an* at this time is fb. In this manner, even if executing control independently, the control devices 14*c* to 14*cn* of the distributed power supply groups 10 to 10*n* can compensate for the magnitude of power required by the entire system with the same frequency, and can maintain the balance between power supply and demand in the system. When a rotary power supply is connected to a bus line in a certain inverter based power supply group, by handling the rotary power supply as a power supply operating as a voltage source, allocation of output between the rotary power supply and the inverter based power supply can be appropriately maintained. This applies to all the embodiments described below.

On the other hand, the second power converters 16 to 16*n* in each of the distributed power supply groups 10 to 10*n* are driven as a current source. Therefore, the second power converters 16 to 16*n* do not interfere with the voltage control of the first power converters 14*a* to 14*an*. Accordingly, in an inverter system in which inverter based power supplies 14 and 16 connected to the same node J1 and inverter based power supplies 14*n* and 16*n* connected to a different node J1*n* are present together, appropriate allocation of output can be maintained, and the voltage and the frequency of the system can be established without performing mutual communication between the inverter based power supplies 14 to 14*n* and 16 to 16*n*.

As described above, according to the present embodiment, a change ratio of active power to each output frequency of the first power converters 14*a* to 14*an* is associated with the dispatching characteristics of power to be supplied to the load. Accordingly, even if executing control of each of the first power converters 14*a* to 14*an* independently, the control devices 14*c* to 14*cn* can compensate for the magnitude of power required by the entire system with the same frequency, and can maintain the balance between power supply and demand in the system.

Second Embodiment

The power supply system 1 according to a second embodiment is different from the power supply system 1 according to the first embodiment in that an output command in a current source mode is provided from a higher-level control device. Differences from the power supply system 1 according to the first embodiment are described below.

Figure 7:
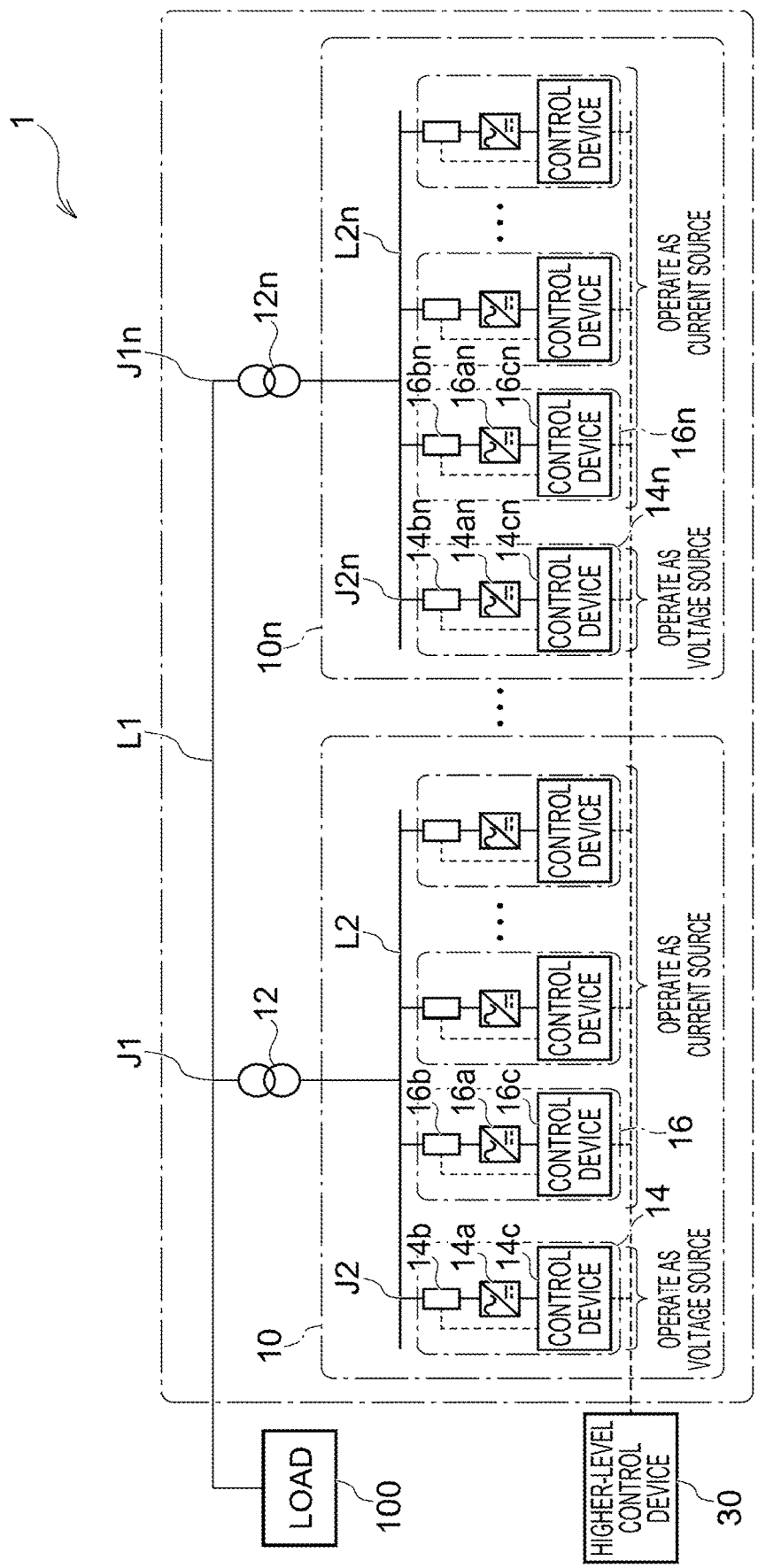
FIG. 7 is a diagram illustrating an overall configuration of a power supply system according to a second embodiment.

FIG. 7 is a diagram illustrating an overall configuration of the power supply system 1 according to the second embodiment. As illustrated in FIG. 7, the power supply system 1 according to the second embodiment is different from the power supply system 1 according to the first embodiment in that a higher-level control device 30 is further provided therein.

The higher-level control device 30 controls the plurality of second inverter based power supplies 16 to 16*n* in each of the distributed power supply groups 10 to 10*n* in an integrated manner. The higher-level control device 30 may control all the second inverter based power supplies 16 to 16*n*, or may control a part of the second inverter based power supplies 16 to 16*n*.

Figure 8:
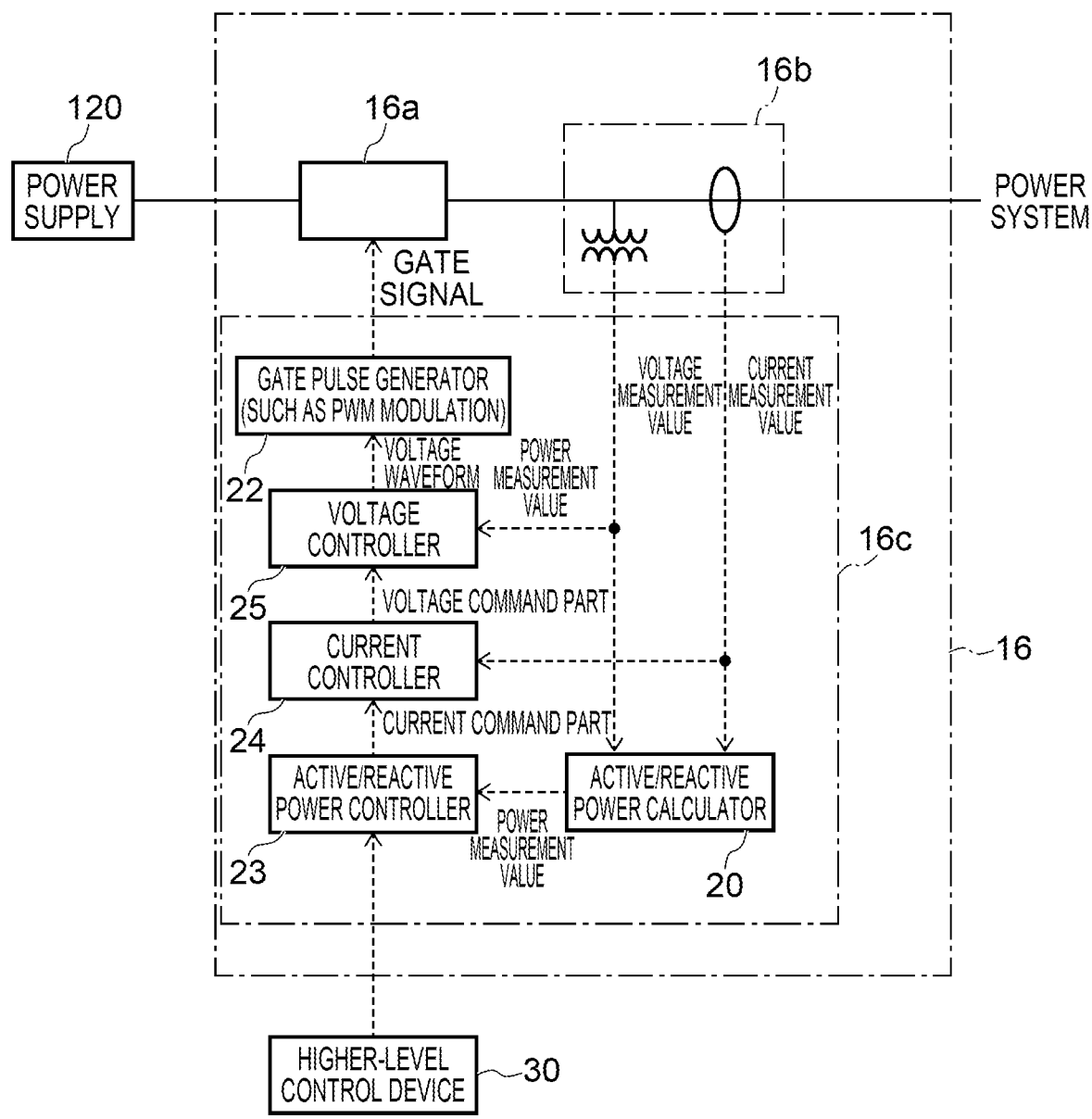
FIG. 8 is a diagram illustrating a configuration example of a control device according to the second embodiment.

FIG. 8 is a diagram illustrating a configuration example of the control device 16*c* according to the second embodiment. As illustrated in FIG. 8, a power command value to be input to the active/reactive power control device 23 is input from the higher-level control device 30.

The higher-level control device 30 decides a power output command value of the second inverter based power supplies 16 to 16*n* by collecting pieces of information from the inverter based power supplies 14 to 14*n*, 16 to 16*n* in each of the distributed power supply groups 10 to 10*n* in the system. At this time, the higher-level control device 30 may decide the power output command value by referring to pieces of information, for example, a voltage measurement value in the system and the state of the load.

In this manner, since the power output command value of the second inverter based power supplies 16 to 16*n* is decided by the higher-level control device 30, allocation of output of the second inverter based power supplies 16 to 16*n* can be changed according to the situations in the system. Further, since the second inverter based power supplies 16 to 16*n* can be used for reducing power variations in the system, output capacities of the first inverter based power supplies 14 to 14*n*, which are required for handling power variations, can be reduced. Further, since outputs of the second inverter based power supplies 16 to 16*n* can be controlled by using the pieces of information on the system, high level system control can be executed by improving distribution of the system voltage, optimizing the power flow, and improving the system stability.

As described above, according to the present embodiment, the first inverter based power supplies 14 to 14*n* can be driven independently without being controlled by the higher-level control device 30, and the second inverter based power supplies 16 to 16*n* are controlled by the higher-level control device 30. Accordingly, with regard to an abrupt power variation, since the first inverter based power supplies 14 to 14*n* can be operated as a voltage source, the communication speed between the higher-level control device 30 and the second inverter based power supplies 16 to 16*n* can be more decreased.

Third Embodiment

The power supply system 1 according to a third embodiment is different from the power supply system 1 according to the first embodiment in that a voltage/current measuring device that measures an output voltage/current of the inverter based power supply group is provided. Differences from the power supply system 1 according to the first embodiment are described below.

Figure 9:
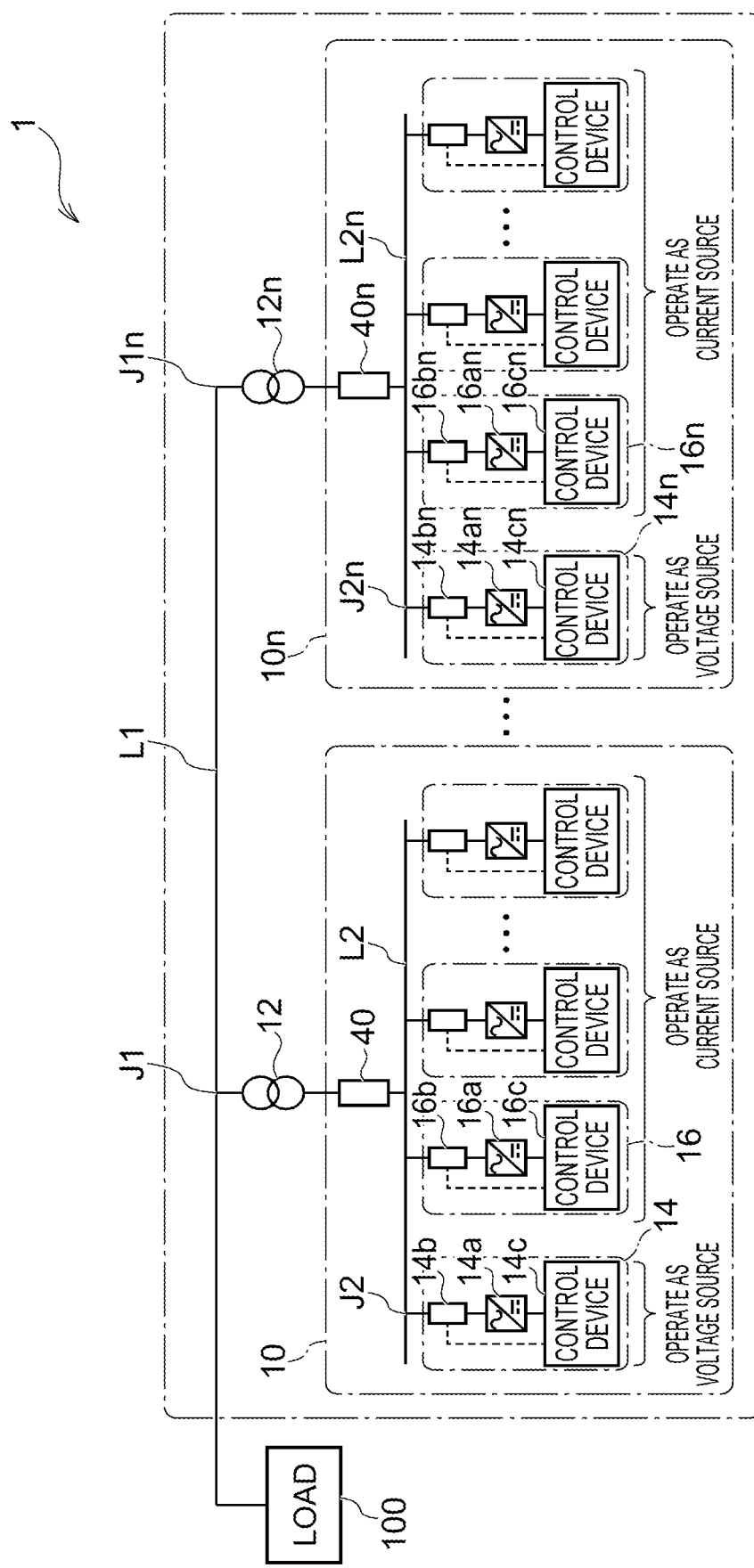
FIG. 9 is a diagram illustrating an overall configuration of a power supply system according to a third embodiment.

FIG. 9 is a diagram illustrating an overall configuration of the power supply system 1 according to the third embodiment. As illustrated in FIG. 9, the power supply system 1 according to the third embodiment is different from the power supply system 1 according to the first embodiment in that voltage/current measuring devices 40 to 40*n* are further provided. Measurement values of the voltage/current measuring devices 40 to 40*n* are shared by the second inverter based power supplies 16 to 16*n* in the corresponding distributed power supply groups 10 to 10*n*.

In the second inverter based power supply 16, a power command value to be input to the active/reactive power controller 23 in the control device 16*c* is decided by using the output power of the entire distributed power supply group to which the second inverter based power supply 16 belongs. For example, the power command value is set to a value acquired by proportionally distributing the output power of the entire distributed power supply group based on a rated output value of the second inverter based power supplies 16.

Figure 10:
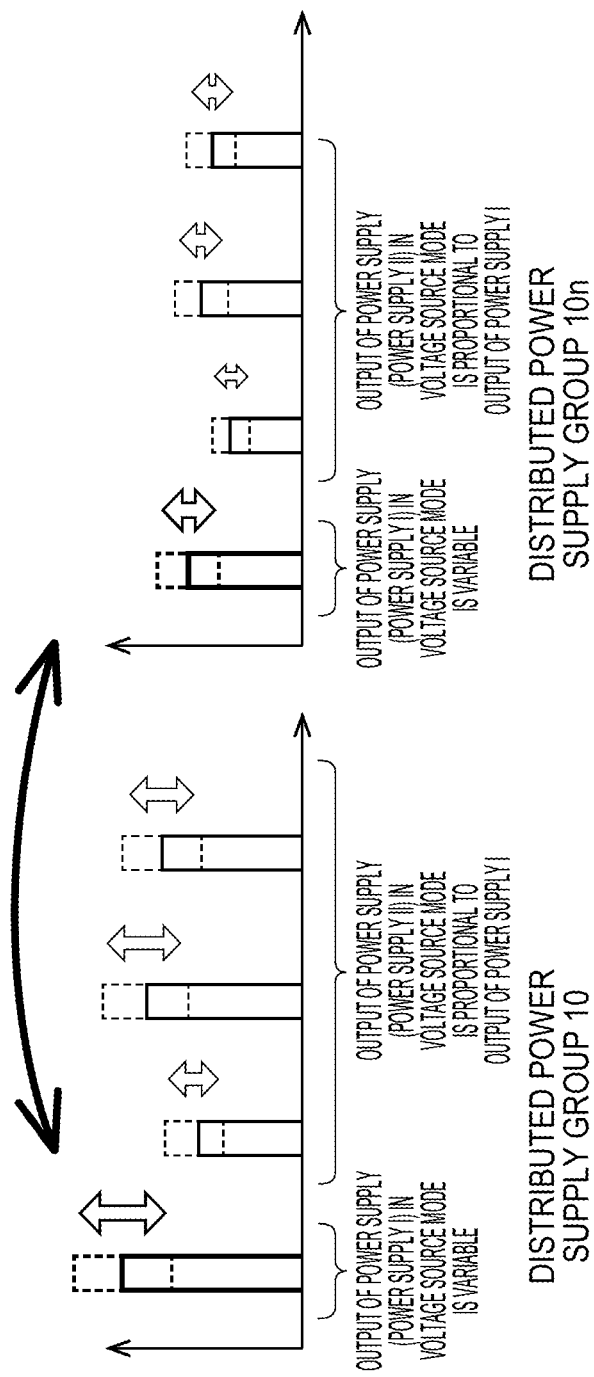
FIG. 10 is a diagram illustrating an operation example of the power supply system according to the third embodiment.

FIG. 10 is a diagram illustrating an operation example of the power supply system 1 according to the third embodiment. A left diagram illustrates an output example of the distributed power supply group 10, and a right diagram illustrates an output example of the distributed power supply group 10*n*. A vertical axis indicates power and a horizontal axis each indicates the first inverter based power supply (power supply I) and a plurality of second inverter based power supplies (power supply II). As illustrated in FIG. 10, the second inverter based power supplies 16 can also be used for reducing power variations.

As described above, according to the present embodiment, the output power commands of the second inverter based power supplies 16 can be changed according to the output power of the entire distributed power supply group. Accordingly, the second inverter based power supplies 16 can also be used for reducing power variations. Therefore, power variations shared by the first inverter based power supplies 14 to 14*n* are reduced, and the output capacity of the first inverter based power supplies 14 to 14*n* required for handling the power variations can be reduced. Further, since there is no need to install the higher-level control device and a communication network between the higher-level control device and each inverter based power supply, an influence of the communication speed between devices can be reduced.

Fourth Embodiment

The power supply system 1 according to a fourth embodiment is different from the power supply system 1 according to the first embodiment in that outputs of the second inverter based power supplies 16 to 16*n* are made proportional to the corresponding first inverter based power supplies 14 to 14*n*. Differences from the power supply system 1 according to the first embodiment are described below.

Figure 11:
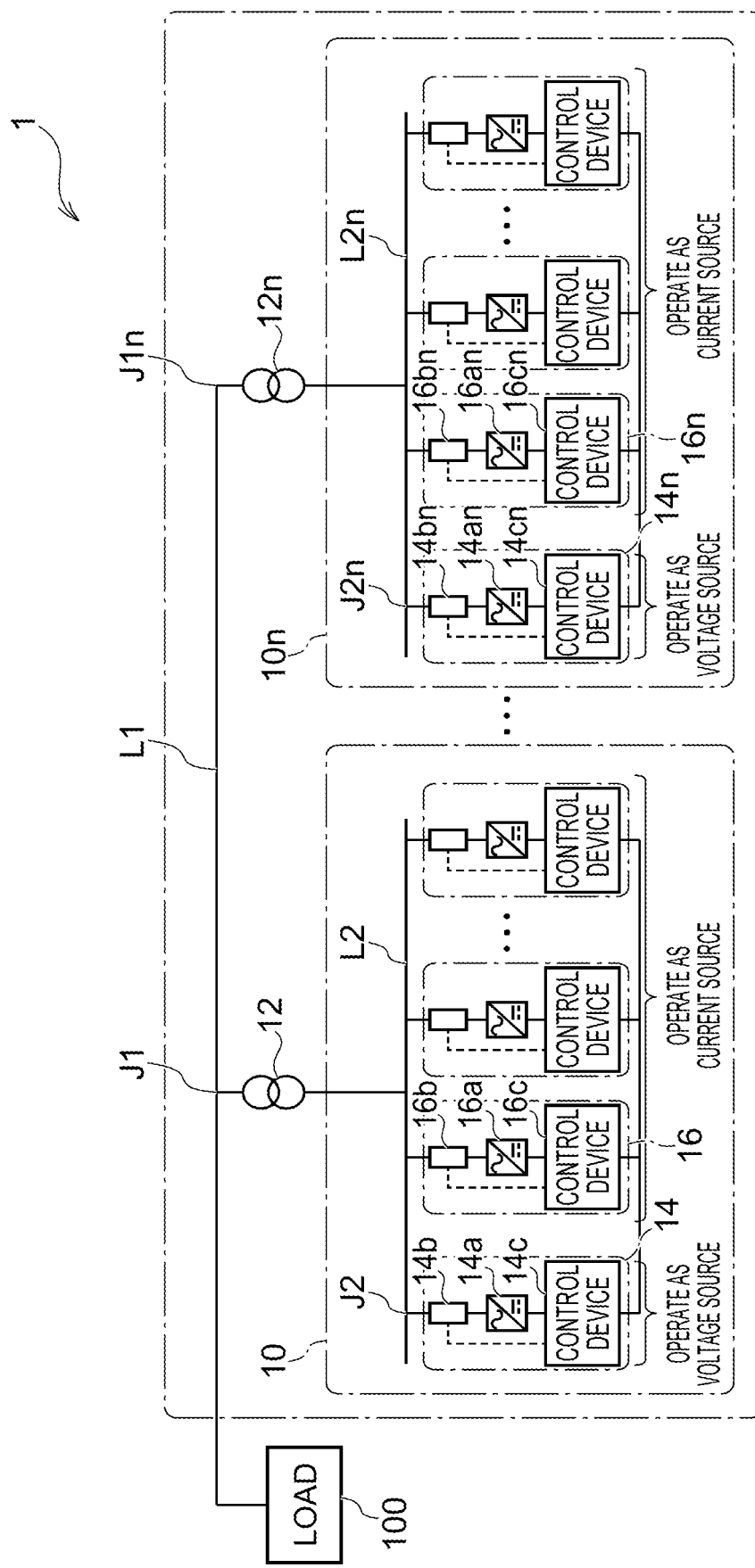
FIG. 11 is a diagram illustrating an overall configuration of a power supply system according to a fourth embodiment.

FIG. 11 is a diagram illustrating an overall configuration of the power supply system 1 according to the fourth embodiment. As illustrated in FIG. 11, the power supply system 1 according to the fourth embodiment is different from the power supply system 1 according to the first embodiment in that the first inverter based power supply 14 and the plurality of second inverter based power supplies 16 included in the same distributed power supply group of the distributed power supply groups 10 to 10*n* are connected by a signal line.

In the plurality of second inverter based power supplies 16, a power command value to be input to the active/reactive power controller 23 in the control device 16*c* is decided by using the output power of the first inverter based power supply 14 that belongs to the same distributed power supply group. For example, the power command value is set to a value acquired by multiplying the output power of the first inverter based power supply 14 by a coefficient corresponding to a rated output value of the second inverter based power supplies 16.

As described above, the power supply system 1 according to the present embodiment sets the outputs of the second inverter based power supplies 16 to 16*n* proportional to the corresponding first inverter based power supplies 14 to 14*n*. Therefore, the second inverter based power supplies 16 can also be used for reducing power variations, without using the voltage/current measuring devices 40 to 40*n* (FIG. 9). Also in this case, since there is no need to install the higher-level control device and a communication network between the higher-level control device and each inverter based power supply, an influence of the communication speed between devices can be reduced.

While certain embodiments have been described, these embodiments have been presented by way of example only, and are not intended to limit the scope of the inventions. The novel apparatus, method, and program described in the present specification may be embodied in a variety of other forms. Further, with regard to the forms of the apparatus, method, and program described in the present specification, various omissions, substitutions, and changes may be made without departing from the spirit of the inventions. These embodiments are described on the basis of an example where power is supplied to a single load as an example. However, the present invention can also be applied to a more complicated system. Further, it is allowable that two or more of these embodiments are combined with each other to construct a power supply system.

The invention claimed is:

1. A power supply system comprising:
a plurality of first power converters configured to supply power according to dispatching characteristics of power to be supplied to a load; and
a plurality of control devices each configured to associate a change ratio of active power to an output frequency of each of the first power converters with the dispatching characteristics and control each of the first power converters based on the change ratio.

2. The system of claim 1, wherein the dispatching characteristics of power is a power dispatch ratio corresponding to an impedance until each of the first power converters is connected to a first bus line.

3. The system of claim 1, wherein each of the control devices causes an amplitude of an output voltage of the first power converter being a control target to be output based on characteristics associated with reactive power.

4. The system of claim 1, wherein
the first power converters are connected to each of a plurality of second bus lines connected in parallel to the first bus line, to which the load is connected, and
the power supply system further comprises a plurality of second power converters, each connected to each of the second bus lines, an output power command value thereto being set to a predetermined value.

5. The system of claim 4, wherein an output power command value with respect to the second power converters is set to a fixed value, or a variable value that changes with time.

6. The system of claim 4, further comprising a higher-level control device configured to generate an output power command value with respect to the second power converters.

7. The system of claim 4, wherein an output power command value with respect to the second power converters is generated based on output power in each of the second bus lines.

8. The system of claim 4, wherein an output power command value with respect to the second power converters is generated based on output power of the first power converter in each of the second bus lines.

9. The system of claim 4, wherein the plurality of first power converters and the plurality of second power converters are an inverter based power supply.

10. A method for controlling a power supply system that includes a plurality of first power converters that supply power according to dispatching characteristics of power to be supplied to a load, the method comprising:
   associating a change ratio of active power to an output frequency of each of the first power converters with the dispatching characteristics and controlling each of the first power converters based on the change ratio.

* * * * *